June 16, 1936.  F. R. SOUKUP  2,044,129
CAN COVER REMOVER
Filed Oct. 29, 1934
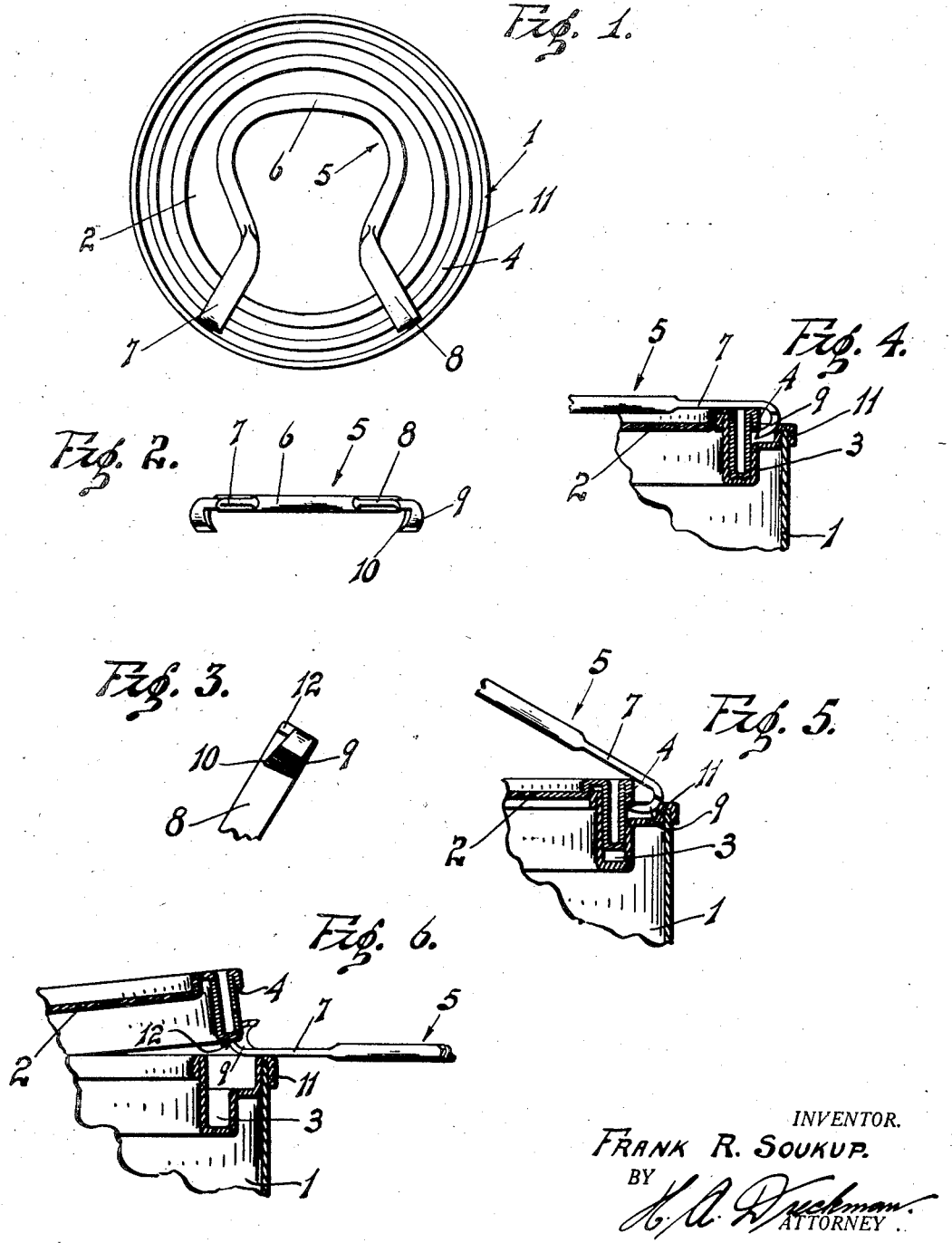
INVENTOR.
FRANK R. SOUKUP.
BY
ATTORNEY.

Patented June 16, 1936

2,044,129

UNITED STATES PATENT OFFICE 2,044,129

CAN COVER REMOVER

Frank R. Soukup, Long Beach, Calif.

Application October 29, 1934, Serial No. 750,514

3 Claims. (Cl. 81—3.1)

This invention relates to a means for easily and effectively removing lids or covers from metal cans, and particularly those lids or covers which have a pressed fit in the can.

An object of my invention is to provide a can cover remover which fits under the edge or lip of the cover, and which will easily remove this cover by swinging the remover in an arc.

Another object is to provide a can cover remover which is simple in construction, inexpensive to manufacture, and which is effective in operation.

Other objects, advantages and features of invention may appear from the accompanying drawing, the subjoined detailed description, and the appended claims.

In the drawing:

Figure 1 is a plan view of my can cover remover in position on a can.

Figure 2 is an end view of the remover.

Figure 3 is a bottom plan view of one of the arms.

Figure 4 is a fragmentary, transverse sectional view of a can, with the remover in position ready to remove the cover.

Figure 5 is a view similar to Fig. 4, but with the lid partly lifted.

Figure 6 is a view similar to Fig. 4, but with the lid entirely removed from the can.

Referring more particularly to the drawing, the numeral 1 indicates a metal can, of usual and well known construction. A lid 2 is pressed into an annular recess 3 in the top of the can for the purpose of sealing the contents of said can. The lid 2 includes an outer flange 4 which is spaced above the bottom of the recess 3.

My cover or lid remover 5 is formed of one continuous strip of metal, the main body having an arcuate bend, as at 6, and from this bend are a pair of arms 7, 8, which arms are bent outwardly at an angle to the arcuate portion 6 so as to more effectively fit the periphery of the lid 2.

On the outer end of each of the arms 7, 8, I provide a tooth 9 integral with the arm, said teeth being bent downwardly and being semicircular in form. A sharp point 10 is provided on each tooth for the purpose of biting into the outer face of the lid to prevent the remover from slipping. When the lid 2 is tightly pressed into the recess 3, the remover will be positioned as shown in Fig. 4.

The arcuate teeth 9 rest under the flange 4 and the outer edge of said teeth bear against the rim 11 of the can. When the body 6 of the remover is lifted upwardly, the teeth 9 will travel in an arc, with the points 10 under the flange 4. There will be a prying action between the edge 11 and the flange 4, which will raise the lid, as shown in Fig. 5.

A continued movement of the remover will bring the shoulder 12 under the bottom of the lid 2, as shown in Fig. 6. The arms 7, 8 rest on top of the rim 11 and the downward pressure on the portion 6 will finally remove the lid from the can.

Having described my invention, I claim:

1. A can cover remover comprising a pair of integrally formed arms, an arcuate tooth on the outer end of each of said arms, each tooth being bent downwardly from an arm, said teeth being adapted and arranged to fit under the outer edge of the can cover whereby said cover may be engaged, and a shoulder on each of said arms, said shoulder being adapted to engage the bottom of the can cover whereby the cover is finally removed.

2. A can cover remover comprising a strip of metal, a pair of arms angularly positioned relative to each other and formed from said strip, an arcuate tooth on the outer end of each of said arms each tooth being bent downwardly from an arm, said teeth being adapted and arranged to fit under the edge of the can cover whereby said cover may be partly removed from the can, each of said teeth having a sharp point to engage the cover, and a shoulder on each of the arms adapted to engage the bottom of the cover to finally remove the same.

3. A can cover remover comprising an integral strip of metal, a pair of arms angularly positioned relative to each other and formed from said strip, said arms being arranged in a common plane, an arcuate tooth on the outer end of each of said arms, each tooth being bent downwardly from an arm, said teeth being adapted and arranged to fit under the edge of the can cover whereby said cover may be partly removed from the can, each of said teeth having a sharp point to engage the cover, and a shoulder on the outer end of each of the arms, said shoulders being substantially in the same plane as the arms, and the shoulder being adapted to engage the bottom of the cover to finally open the same.

FRANK R. SOUKUP.